July 14, 1970 H. C. SCHMID 3,520,476
ELECTRONIC SOIL MOISTURE AND TEMPERATURE SENSING DEVICE
Filed July 19, 1967

*INVENTOR.*
Howard C. Schmid

United States Patent Office 3,520,476
Patented July 14, 1970

3,520,476
ELECTRONIC SOIL MOISTURE AND TEMPERATURE SENSING DEVICE
Howard C. Schmid, 2700 Queen St.,
Missoula, Mont. 59801
Filed July 19, 1967, Ser. No. 654,662
Int. Cl. A01g *25/00;* G01n *27/12*
U.S. Cl. 239—63          4 Claims

ABSTRACT OF THE DISCLOSURE

An improved device responsive to the temperature and moisture content of soil for controlling irrigating systems. The electrical resistance of a fibrous material decreases or increases, respectively, as the material is compressed or expanded due to the thermal contraction or expansion of restraining members situated about the material; or as the material absorbs more or less moisture from the surrounding soil, the associated irrigation system being activated on low current through the material.

---

My invention relates to a device for controlling the flow of an electrical current in a moist material and particularly to such a device which may serve as a sensing instrument for controlling irrigating systems in lawns, gardens, and fields.

Electronic devices commonly used in the soil for sensing the moisture and activating water flow control valves operate solely from moisture content, closing valves when sufficient current passes through the dampened medium; when the temperature is high the current passes through more easily reducing the flow of water during warm weather when water is needed the most.

A primary object of my invention is to provide an electronic sensing device which is activated by moisture content while at the same time responding to temperature change, reversing the effect of increased electrical current flow with rising temperature.

A further primary object of my invention is to provide an electronic sensing device which may be easily changed to accommodate a wide temperature and moisture range.

More particularly, my present invention comprises an electronic sensing device in which a current is introduced in an insulated wire bared and tinned on the end and imbedded in a fibrous material in such a way that when the soil or other substance surrounding the fibrous material becomes saturated with moisture in turn saturating the fibrous material, the circuit is completed and an electrical current flows through it to a second wire introduced into the fibrous material at a different point. A high current flow shuts off the associated irrigation system. The fibrous material is permitted to expand in response to rise in the soil temperature by a system of wires and metals of widely divergent coefficients of thermal expansion. This expansion lowers the coductance of the fibrous material. Thus, the device may be used to supply relatively more water to the associated irrigation equipment during warm weather than would the previously mentioned known devices which operate solely as a function of soil moisture content.

Figure 1:
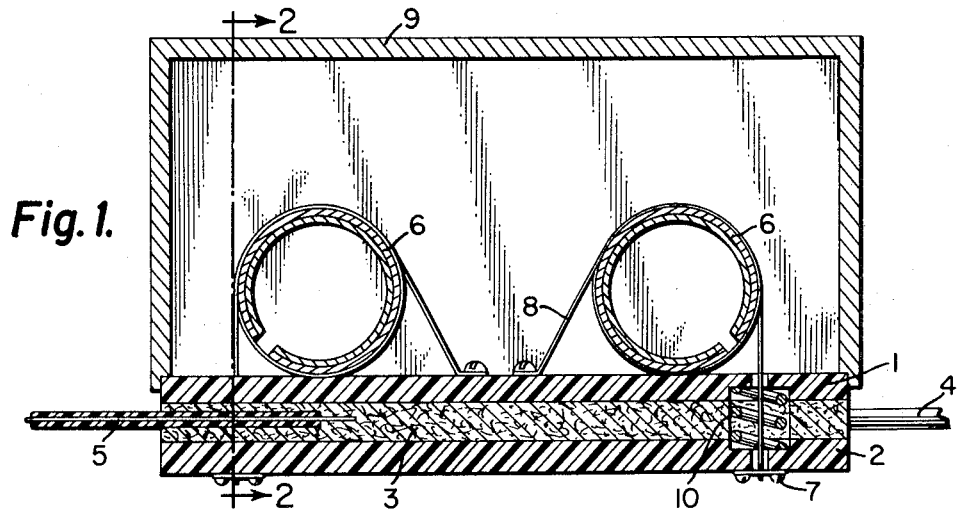
Figure 3:
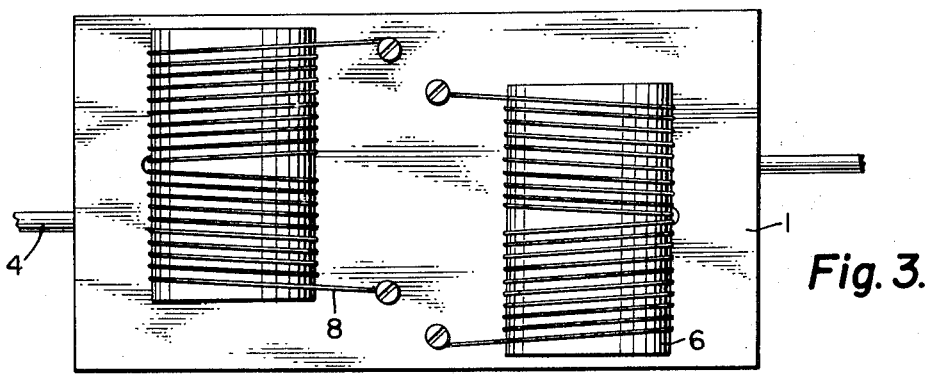
Figure 2:
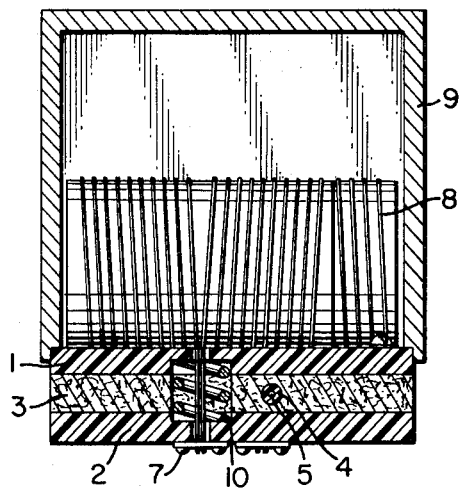
Figure 4:
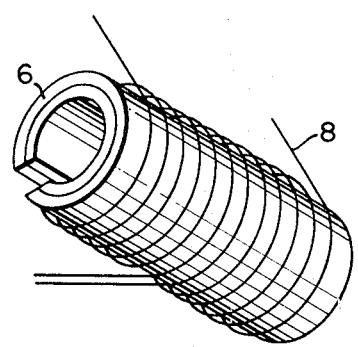

My invention will be further described in connection with the accompanying drawings:

In the drawings, FIG. 1 is a vertical cross-sectional view through a sensing device embodying my invention, FIG. 2 is a vertical cross-sectional view taken on line 2—2 of FIG. 1, FIG. 3 is a horizontal view with protective cover removed, FIG. 4 is a perspective view of one of the thermal cylinders.

Referring now to the drawings, the numerals 1 and 2 indicate plates of non-conducting plastic on both sides of a layer of fibrous material such as foam type cellulose number 3 which absorbs moisture on its edges and has imbedded in its ends wires number 4 with bared, tinned ends number 5.

As moisture is absorbed by the fibrous material 3 from the surrounding soil or other material, a current will flow between wires 5, the magnitude of the current depending upon the temperature, moisture content and the density of the fibrous material. For example, as the soil temperature drops, wires 8, which are composed of aluminum or other metal having a high coefficient of thermal expansion, contract between retaining washers and screws 7, thus overcoming springs 10 and forcing plastic plates 1 and 2 to compress the fibrous material 3 and to increase its density. Hence, the flow of current will increase between wires 5. Compression of the fibrous material is increased by split hollow thermal cylinders 6, which are composed of a layer of aluminum or other metal having a high coefficient of thermal expansion on their exterior and circumferential strips of invar, an alloy of steel with a coefficient of thermal expansion less than $\frac{1}{25}$ that of aluminum on their interior. The circumferential strips prevent prevent longitudinal distortion of the cylinders. The contraction of the aluminum, opposed by the invar, increases the diameter of the cylinder which tends to further compress the fibrous material. A cover 9 encloses the thermal cylinders.

The sensing device has been described in detail in connection with its use as a device for activating the controls of an irrigating system, but it is to be understood that its usefulness is not restricted to that particular type of device.

From the foregoing description it will be seen that the present invention provides an electronic sensing device which reacts positively to increases in moisture and negatively to increases in temperature of a design permitting the optimum of variations to fill the desires and needs of the user.

I claim:
1. In an irrigating system comprising a water supplying means, normally closed electrically operated valve governing the supply of water to the supplying means, a power source, a circuit for opening said valve in response to a predetermined low electrical current and an electrical soil moisture content sensing device located in said circuit, an improved sensing device comprising:
    first and second electrically non-conductive plates having a compressible, moisture absorbing layer between them and having openings therein to permit absorption of moisture from the soil; electrical conductors protruding into said layer and having their ends substantially separated within said layer:
        means for compressing said layer by compressing said plates together in response to a drop in the ambient temperature and for permitting said layer to expand in response to a rise in ambient temperature;
        whereby the electrical resistance of said layer is caused to vary directly with temperature and inversely with moisture content and hence to regulate the flow of current in said circuit.
2. The improvement as in claim 1, wherein said moisture absorbing layer is foam cellulose.
3. The improvement as in claim 1, wherein said means for compressing or expanding said layer comprises:
    hollow cylindetrs resting on the outer surface of said first plate and having a longitudinal slot along the length and through the thickness of the cylinder wall, said cylinders comprising a material with a high coefficient of thermal expansion in an exterior layer and circumferential strips of a material with a low coefficient of thermal expansion in an interior layer; wires of a material of high coefficient of thermal expansion, said wires being wound around said cylinders and having one end secured to said first plate and the other end passing through one of said openings in said first plate and being secured to said second plate; spring means located between said plates for forcing said plates apart; whereby contraction of the wires and expansion of the cylinders due to a drop in ambient temperature causes said plates to come together and to compress said layer.

4. The improvement as in claim 3, wherein said material of high coefficient of thermal expansion is aluminum and said material of low coefficient of thermal expansion is invar.

References Cited

UNITED STATES PATENTS

| | | | |
|---|---|---|---|
| 2,258,958 | 10/1941 | Pearson | 338—25 |
| 2,285,421 | 9/1942 | Dunmore. | |
| 2,812,976 | 11/1957 | Hasenkamp | 239—63 |
| 3,181,098 | 4/1965 | Richards | 338—34 |

RICHARD C. QUEISSER, Primary Examiner

C. E. SNEE III, Assistant Examiner

U.S. Cl. X.R.

73—73; 137—78; 338—14; 200—61.04; 337—300